US010323153B2

(12) United States Patent
Kurahashi et al.

(10) Patent No.: US 10,323,153 B2
(45) Date of Patent: Jun. 18, 2019

(54) CORROSION-RESISTANT SPRAYED COATING, METHOD FOR FORMING SAME AND SPRAYING DEVICE FOR FORMING SAME

(71) Applicants: Nakayama Amorphous Co., Ltd., Osaka (JP); Yoshikawa Kogyo Co., Ltd., Fukuoka (JP)

(72) Inventors: Ryurou Kurahashi, Osaka (JP); Toshiharu Morimoto, Osaka (JP); Yoshio Shin, Osaka (JP); Fumiaki Otsubo, Fukuoka (JP); Yasuhiro Omori, Hyogo (JP); Takashi Kumai, Hyogo (JP); Yusuke Nishiura, Hyogo (JP); Toshifumi Horita, Hyogo (JP)

(73) Assignee: YOSHIKAWA KOGYO CO., LTD., Kitakyushu-Shi, Fukuoka (JP)

( * ) Notice: Subject to any disclaimer, the term of this patent is extended or adjusted under 35 U.S.C. 154(b) by 126 days.

(21) Appl. No.: 15/115,746

(22) PCT Filed: Jan. 27, 2015

(86) PCT No.: PCT/JP2015/052111

§ 371 (c)(1),
(2) Date: Aug. 1, 2016

(87) PCT Pub. No.: WO2015/115394

PCT Pub. Date: Aug. 6, 2015

(65) Prior Publication Data

US 2017/0015838 A1 Jan. 19, 2017

(30) Foreign Application Priority Data

Jan. 31, 2014 (JP) ................................ 2014-017943

(51) Int. Cl.
*B05B 7/16* (2006.01)
*B05B 7/20* (2006.01)
(Continued)

(52) U.S. Cl.
CPC ............ *C09D 5/103* (2013.01); *B05B 7/1626* (2013.01); *B05B 7/203* (2013.01); *B32B 15/01* (2013.01);
(Continued)

(58) Field of Classification Search
CPC ......... C09D 5/103; B05B 7/203; B05B 7/205; C23C 4/06; C23C 4/129
See application file for complete search history.

(56) References Cited

U.S. PATENT DOCUMENTS 4,593,007 A * 6/1986 Novinski .................. C23C 4/06 427/447
5,820,939 A * 10/1998 Popoola .................... C23C 4/04 427/449
(Continued)

FOREIGN PATENT DOCUMENTS

CN 101501236 A 8/2009
CN 103320783 A 9/2013
(Continued)

OTHER PUBLICATIONS

Sun Jiashu et al., "Thermal spraying science and technology", Metallurgical Industry Press, First Edition, Oct. 31, 2013, with English translation of relevant portion.
(Continued)

*Primary Examiner* — Liam J Heincer
(74) *Attorney, Agent, or Firm* — Bacon & Thomas, PLLC

(57) ABSTRACT

[Problem] To provide a corrosion-resistant coating that exhibits greater corrosion protection in saltwater environments and the like than was conventional, a method for forming the same, and a device for forming the same.
(Continued)

1 Wire-type coating formation device
14 Gas cap
15 Tip-nozzle inner cylinder
11 Material-wire supply pipe
16 Tip-nozzle outer cylinder
12b Oxygen supply pipe
13 Internal cooling gas supply pipe
12a Acetylene supply pipe
10 Wire-type flame spray gun

[Solution] A corrosion-resistant alloy coating is formed on a substrate surface by: a) using a thermal spray gun, having a function wherein a flame including melted material particles is jetted toward a substrate, and the flame is partitioned from the open air in an upstream region on said jet path (which is to say the region in which the material particles are melted), and a function wherein, in a downstream region (the area continuing from the upstream region), the material particles and the flame are forcibly cooled by a jet-gas or jet-mist before reaching the substrate; and b) using a corrosion-resistant alloy material comprising aluminum, for the material particles.

4 Claims, 6 Drawing Sheets

(51) Int. Cl.

| | |
|---|---|
| ***C09D 5/10*** | (2006.01) |
| ***C23C 4/08*** | (2016.01) |
| ***C23C 4/12*** | (2016.01) |
| ***B32B 15/01*** | (2006.01) |
| ***C22C 21/06*** | (2006.01) |
| ***C23C 4/129*** | (2016.01) |

(52) U.S. Cl.
CPC ............ *B32B 15/012* (2013.01); *C22C 21/06* (2013.01); *C23C 4/08* (2013.01); *C23C 4/12* (2013.01); *C23C 4/129* (2016.01)

(56) References Cited

U.S. PATENT DOCUMENTS 5,922,275 A * 7/1999 Kageyama .............. B22F 3/115 420/428
5,956,845 A * 9/1999 Arnold ................. B23K 20/021 29/402.07
H1869 H * 10/2000 Beardsley .................. 123/188.3
6,221,504 B1 * 4/2001 Pfeffinger ............ B22F 1/0096 428/558
6,231,969 B1 * 5/2001 Knight ...................... C23C 4/06 428/332
6,372,299 B1 * 4/2002 Thompson ................ C23C 4/02 427/250
9,959,950 B2 * 5/2018 Kiuchi ...................... C23C 4/06
2002/0073982 A1 * 6/2002 Shaikh .................... C23C 24/04 123/688
2003/0049485 A1 * 3/2003 Brupbacher ........... B05D 5/083 428/615
2003/0088980 A1 * 5/2003 Arnold .................... B23P 6/007 29/889.1
2008/0090071 A1 4/2008 Valle et al.
2008/0219882 A1 * 9/2008 Woydt ................. B22D 21/007 420/544
2009/0194233 A1 * 8/2009 Tamura ............... C23C 16/4404 156/345.1
2009/0246398 A1 * 10/2009 Kurahashi ................. C23C 4/12 427/456
2010/0028658 A1 * 2/2010 Nagasawa ............. C09D 5/106 428/328
2010/0282428 A1 * 11/2010 Pandey ................... C22C 21/00 164/46
2011/0064963 A1 * 3/2011 Cheney ................ B23K 1/0008 428/576
2011/0123431 A1 * 5/2011 Toma ........................ C23C 4/11 423/625
2013/0011570 A1 * 1/2013 Kurahashi ............... B05B 7/205 427/448
2013/0101820 A1 * 4/2013 Yonekura ................ C23C 2/003 428/215
2013/0122193 A1 * 5/2013 Xue ........................ B29C 33/56 427/135
2013/0202815 A1 * 8/2013 Hass ....................... C23C 16/06 427/576
2015/0118516 A1 * 4/2015 Boileau ..................... C23C 4/08 428/653
2016/0251975 A1 * 9/2016 Strock ....................... C23C 4/06 415/173.4
2017/0015838 A1 * 1/2017 Kurahashi ................. B05B 7/22
2017/0233852 A1 * 8/2017 Yao ......................... C23C 4/129 428/680
2017/0327956 A1 * 11/2017 Kang ...................... C23C 28/02

FOREIGN PATENT DOCUMENTS

EP 1762639 A1 * 3/2007 ............. C22C 21/06
EP 2060652 A1 5/2009
JP H06330263 A 11/1994
JP H101766 A 1/1998
JP 2001247953 A 9/2001
JP 2002053943 A 2/2002
JP 2007131952 A 5/2007
JP 2008043869 A 2/2008
JP 2008-517159 A 5/2008
JP 2010022895 A 2/2010
WO 99/47723 A1 9/1999
WO 2008020585 A1 2/2008
WO 2013105613 A1 7/2013

OTHER PUBLICATIONS

Liu Yin et al., "The foundation of engineering materials and forming technology", Beijing Institute of Technology Press, First Edition, Jul. 31, 2009, with English translation of relevant portion.
European Search Report in corresponding European Application No. EP 15742600.8, dated Sep. 28, 2017.

* cited by examiner (a) Comparative Example 1

(b) Working Example 1

(c) Working Example 2

(c) Working Example 3

CORROSION-RESISTANT SPRAYED COATING, METHOD FOR FORMING SAME AND SPRAYING DEVICE FOR FORMING SAME

TECHNICAL FIELD

The present invention relates to a sprayed coating that covers a surface such as the surface of a structure, a method for forming the same and a device for forming the same; more specifically, it provides a sprayed coating having excellent corrosion resistance against seawater, salt, and the like.

BACKGROUND ART

It is known that steel structures built in marine climate regions are greatly damaged due to corrosion resulting from seawater and sea-salt particles. Consequently, efforts have been made to provide some sort of corrosion protection surface treatment on these steel structures, in order to inhibit corrosion. Painting, hot-dip galvanizing and hot-dip aluminizing are representative.

Other methods include forming a sprayed coating of zinc or aluminum, or alloys of these, which exhibits an electrochemically base potential, by way of thermal spraying. However, while conventional corrosion protection techniques based on sprayed coatings of metals such as zinc and aluminum on steel structures were found to have some corrosion protection effect, because the steel structures were protected by way of a sacrificial anodic effect, periodic respraying was necessary (see Patent Literature 1 and 2, below).

Thus, it has recently become more common to perform thermal spraying with corrosion-resistant alloys such as Al—Mg alloys, which can impart better characteristics for salt water environments than zinc and aluminum.

However, there is a problem insomuch as, because sprayed coatings become porous, they are readily subject to salt damage, and thus the rate of corrosion damage to the steel structures is high. Further, in ordinary thermally sprayed coatings, when the fine particles of the sprayed material fly out in the sprayed gas stream, they are flattened, so as to form a laminated structure on the substrate, together with which the individual particles are heated and fused, and at this time they are oxidized by the air in the spraying atmosphere, such that oxide films necessarily form on the surfaces thereof, which results in the formation of minute voids, mediated by the oxide films, and these voids become routes through which aqueous solutions such as seawater penetrate into the interior.

For this reason, in locations having aggressive saltwater environments such as coastal regions, the durability of coatings is conventionally no more than a few dozen years, even with corrosion protection methods based on Al—Mg spraying. Considering the infrastructure development environment that is associated with the future decreasing population of Japan, there is now a strong demand for these to last longer, for example on the scale of 100 years.

CITATION LIST

Patent Literature

[PTL 1] Japanese Patent Application Publication No. 2001-247953

[PTL 2] Japanese Patent Application Publication No. H10-1766

SUMMARY OF INVENTION

Technical Problem

When Al—Mg is sprayed with an ordinary flame spray gun, because the cooling rate is insufficient, the grain size of the Al—Mg structure in the coating that is formed is large, at several tens of μm, and thus corrosion tends to develop from the grain boundaries. Furthermore, when spraying with an ordinary flame spray gun, because magnesium readily oxidizes in flame, the magnesium concentration in the Al—Mg coating is reduced, such that the predetermined corrosion protection is not exhibited. The decreased magnesium concentration also lowers the strength of the Al—Mg alloy coating, and degrades the scratch resistance thereof. Because the sacrificial corrosion protection effect of aluminum sprayed coatings is inferior to that of zinc, there are disadvantages in terms of early local rust formation due to fine cracks that form during spraying, which degrades appearance and performance. Furthermore, the magnesium oxide or aluminum oxide formed due to oxidation during thermal spraying with an ordinary flame spray gun lowers corrosion protection.

The present invention solves the problems described above, and provides a corrosion-resistant coating that exhibits better corrosion protection than was conventional in saltwater environments and the like, a method for forming the same, and a device for forming the same.

Solution to Problem

In the method for forming a corrosion-resistant sprayed coating according to the invention, a corrosion-resistant alloy sprayed coating is formed on a substrate surface,

- using a thermal spray gun, having a function wherein a flame including melted material particles is jetted toward a substrate, and the flame is partitioned from the open air in an upstream region on said jet path (which is to say the region in which the material particles are melted), and a function wherein, in a downstream region (the area continuing to the front of the upstream region), the material particles and the flame are forcibly cooled by a jet-gas or jet-mist before reaching the substrate; and
- using a material having (a component ratio equivalent to) a corrosion-resistant alloy comprising aluminium, for the material particles.

Depending on the type of substrate, the type of material and the like, the substrate may be preheated before starting thermal spraying with the gun described above.

With the formation method described above, a sprayed coating having excellent corrosion protection can be formed on the substrate surface, such that the substrate can be fully protected. The reasons for this are:

a) Because the flame is partitioned from the open air in the upstream region of the jet path in which the flame including melted material particles is jetted toward the substrate, which is to say the region in which the material particles are melted, the melted material particles do not readily oxidize, and thus the corrosion protection of the sprayed coating is not lowered, and there is no cracking or early local formation of rust. Accordingly, the pores (voids) inherent to sprayed coatings can be reduced and penetration to the interior by corrosive media such as seawater can be effectively prevented.

b) Because, in a downstream region, the material particles and the flame are forcibly cooled by a jet-gas or jet-mist before reaching the substrate, the material particles can be cooled at a very high rate of approximately 1,000,000° C. per second or more. Consequently, the corrosion-resistant alloy comprising aluminium can form a microstructure (a structure with a grain size of 10 μm or less), which can endow the corrosion-resistant alloy coating with very high corrosion resistance.

Note that the reasons for which a material comprising aluminum is used as a starting material are that aluminum is a less noble metal than steel and thus can be expected to have excellent corrosion protection, aluminum is a naturally occurring non-toxic material, and aluminum is lighter than steel.

The corrosion-resistant sprayed coating produced by the method described above may be formed on the surfaces of substrates made from aluminum or aluminum alloys.

The method for forming a corrosion-resistant sprayed coating described above can be used for the surfaces of steel-structure substrates such as bridges, towers and vessels, but can also be used on the surfaces of substrates made from aluminum or aluminum alloys or the like. This is because the material particles and the flame are cooled before reaching the substrate, by the jet-gas or jet-mist, as described above, and thus the temperature at surface of the substrate that is to be thermally sprayed will not be raised to an extent that would melt the substrate. Furthermore, by forming the coating described above on the surface of an aluminum or aluminum alloy substrate, the aluminum or aluminum alloy substrate can be suitably covered and protected.

The amount of oxygen supplied to the flame in the aforementioned upstream region where the flame is partitioned from the open air may be less than the amount of oxygen necessary for complete combustion.

In this manner, it is possible to more effectively prevent oxidation of the melted material particles and thus further improve the corrosion protection of the sprayed coating.

Either:

- a material comprising 0.3 to 15 mass % magnesium and a remainder of aluminium; or
- a material comprising magnesium, silicon, manganese, titanium, copper and aluminium, may be used as the corrosion-resistant alloy material.

By using a starting material comprising both aluminum and magnesium, not only can the surface hardness be improved, but because magnesium is a less noble metal than commonly used zinc, there is a greater sacrificial corrosion protection effect due to the potential difference with steel, when steel is used for the substrate, and thus an effect can be achieved in which a dense protective coating can be formed by including magnesium.

Note that, with the formation method and formation device (described hereafter) of the invention, other materials that do not comprise aluminum can also be thermally sprayed, whereby it is possible to form coatings of various metals on the substrate, which have microstructures, and which have excellent corrosion resistance and the like.

The corrosion-resistant alloy material comprising aluminum may be supplied to the thermal spray gun described above in the form of a powder (a mixed powder of separate elements or a powder of an alloy) or in the form of a wire (which is formed integrally from an alloy).

In particular, when the corrosion-resistant alloy materials is supplied in the form of a wire, in addition to advantages in terms of the materials costs for the coating and on-site work considerations, there are also advantages in terms of the ease with which the material can be handled.

The device for forming a corrosion-resistant sprayed coating according to the invention is:

- a thermal spraying device for forming a corrosion-resistant alloy coating comprising aluminum on a substrate surface,
- comprising a thermal spray gun having a function wherein a flame including melted material particles is jetted toward a substrate, and the flame is partitioned from the open air in an upstream region on said jet path, and a function wherein, in a downstream region, the material particles and the flame are forcibly cooled by a jet-gas or jet-mist before reaching the substrate.

With such a formation device, it is possible to perform the method for forming the corrosion-resistant sprayed coating described above so as to form a corrosion-resistant sprayed coating comprising aluminum on a substrate surface, in which oxidation of the material particles is inhibited, the grain size is small, and there are few pores, such that the corrosion protection is high.

It is further preferred that the formation device described above have any (or all) of the following characteristics. Namely,

- supplying the corrosion-resistant alloy material in the form of a powder or a wire (providing this in the form of a wire is particularly advantageous in terms of costs and the like);
- supplying the jet-gas or jet-mist so as to form a flow in a gradually narrowing cylindrical shape (whereby both a function of partitioning the flame from the open air in the downstream region of the flame jet path and a cooling function are provided);
- causing the jet-gas or jet-mist to be an annular jet, concentric with the jetted flame, and supplying it at an angle such as to intersect the centerline of the flame at a forward distance from the flame jet opening of 3 to 7 times the width or diameter of the flame (whereby the jet-gas or jet-mist makes strong contact with the flame, which can increase the flame cooling rate, and make the grain size smaller);
- causing the amount of oxygen supplied to the flame in the upstream region to be less than the amount of oxygen necessary for complete combustion (whereby oxidation of the melted material particles can be particularly effectively prevented); and
- cooling the melted material particles at a rate of 1,000,000° C. per second or more with the jet-gas or jet-mist (whereby the grain size is made particularly small).

The corrosion-resistant alloy sprayed coating according to the invention is a coating formed by thermal spraying:

- comprising aluminum;
- having a porosity of 1% or less; and
- forming a microstructure with a grain size of 10 μm or less (some of which preferably including a so-called nanostructure with a submicron grain size).

For the following reasons, such a corrosion-resistant alloy sprayed coating functions as an advantageous coating for preventing corrosion.

a) Because aluminum is a less noble metal than steel, it exhibits excellent corrosion protection. Aluminum is also preferred because it is a naturally occurring non-toxic material, and is lighter than steel.

b) The porosity is 1% or less, such that there are very few of the pores inherent to thermally sprayed coatings, such that penetration to the interior by corrosive media such as seawater can be effectively prevented.

c) Because a microstructure is formed with a grain size of 10 μm or less, as it differs from conventional coatings formed by thermally spraying aluminum alloys with an ordinary flame spray gun, the phenomenon in which corrosion develops from the grain boundaries does not readily occur.

The following are also preferred as the corrosion-resistant sprayed coating described above. Namely,

- a corrosion-resistant alloy sprayed coating comprising 0.3 to 15 mass % magnesium and the balance aluminum;
- a corrosion-resistant alloy sprayed coating comprising magnesium, silicon, manganese, titanium, copper and aluminum;
- a corrosion-resistant alloy sprayed coating comprising magnesium, in which the total content of magnesium and aluminum oxides is 0.2 mass % or less; and
- a corrosion-resistant alloy sprayed coating in which the coating surface is covered and sealed by a silicone or epoxy resin.

In particular, if the total content of magnesium and aluminum oxides is 0.2 mass % or less as described above, not only does this avoid reductions in corrosion protection due to the oxides, but there are advantages in so much as the strength of the coating is not lowered and thus the scratch resistance is high.

Furthermore, if the coating surface is sealed by covering it with silicone or epoxy resin, a few pores, if any, are sealed and penetration by seawater or the like is prevented, and thus corrosion protection is not lowered.

A corrosion-resistant alloy coating such as described above may be formed on a substrate surface by thermal spraying with the formation method described above.

Effects of the Invention

A sprayed coating having excellent corrosion protection can be formed on a substrate surface by the method for forming a corrosion-resistant sprayed coating according to the present invention or by the device for forming a corrosion-resistant sprayed coating according to the present invention. Furthermore, the corrosion-resistant alloy sprayed coating according to the present invention exhibits better corrosion protection than was conventional, for example, in saltwater environments and the like.

DESCRIPTION OF EMBODIMENTS

Hereinafter, the present invention will be described in detail. A corrosion-resistant alloy sprayed coating is formed on a surface of a steel structure, steel plate or the like, by spraying with a coating formation device, which is a special thermal spray gun, using a material principally comprising Al—Mg.

Figure 1:
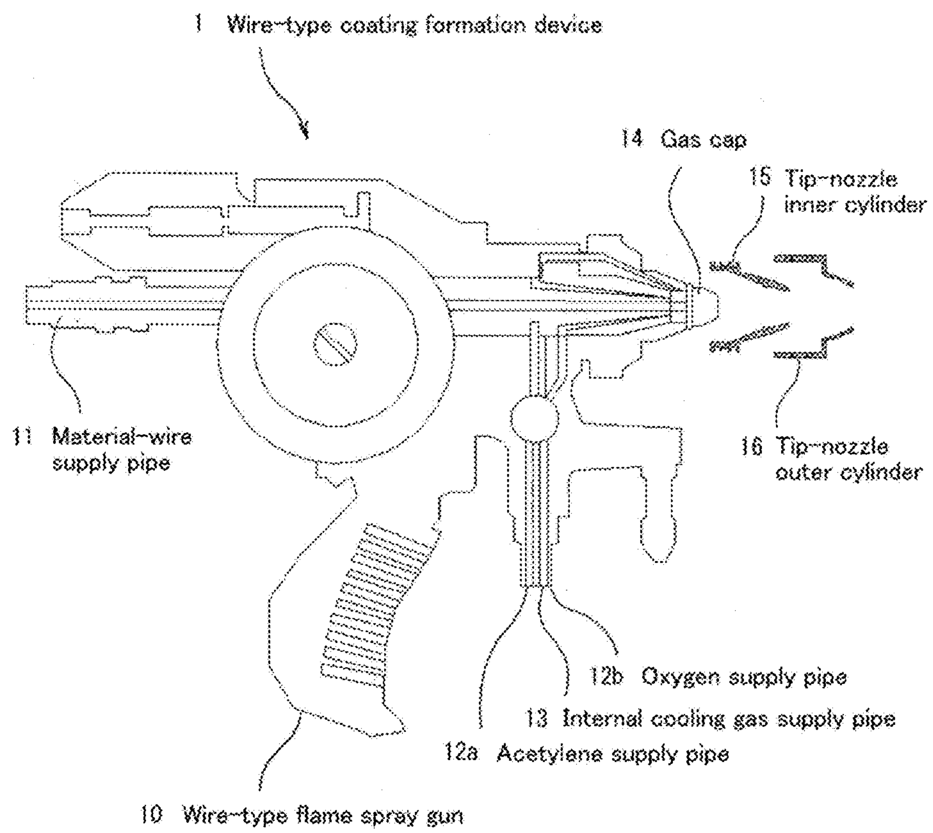
FIG. 1 This is a side view showing a wire-type coating formation device 1.
Figure 2:
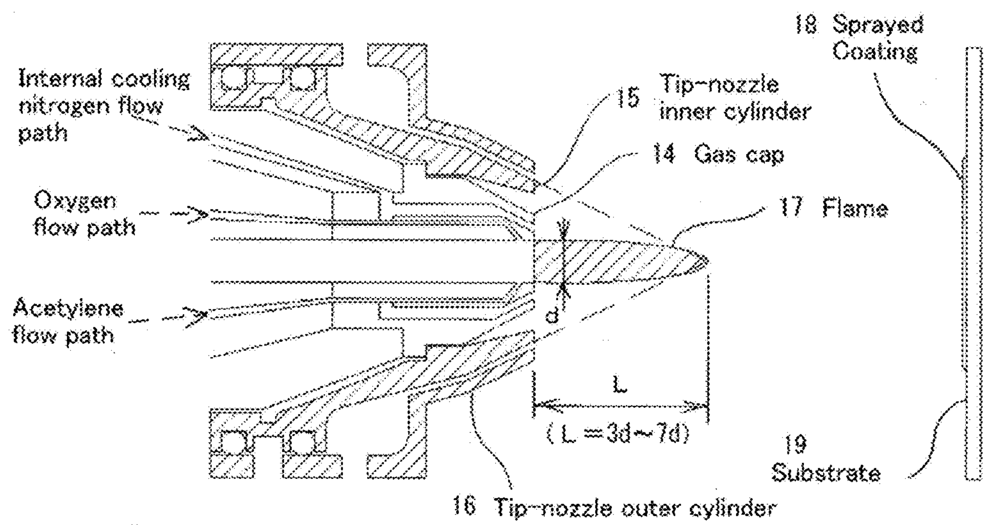
FIG. 2 This is an enlarged assembly view showing the vicinity of the tip-nozzle of the wire-type coating formation device 1.

The wire-type coating formation device 1 used is shown in FIG. 1 and FIG. 2.

In the illustrated wire-type coating formation device 1, as an external cooling means, a double nozzle comprising a tip-nozzle inner cylinder 15 and a tip-nozzle outer cylinder 16, from which a jet-gas (or mist) is output for external cooling of a flame or the like, is mounted on the forward end of a flame-type thermal spray gun 10, to which a material for coating is supplied as a wire.

While omitted in the drawings, the wire-type flame spray gun 10 is connected to a material-wire supply pipe 11, in which the material-wire that will be thermally sprayed is supplied by way of a gas turbine (for example, using nitrogen), an acetylene supply pipe 12*a* that serves as fuel, an oxygen supply pipe 12*b*, and a supply pipe 13, for an internal cooling gas (for example nitrogen). A gas cap 14 is provided at the front end of the wire-type flame spray gun 10, from which, as shown in FIG. 2, the flame 17 and the molten material (resulting from melting the aforementioned material wire) are jetted. The aforementioned internal cooling gas is expelled from a position bordering the inside of the gas cap 14, so as to cool the gas cap 14 and regulate the temperature of the flame 17. The gas cap 14 is fixed on the wire-type flame spray gun 10 in the vicinity of the forward end thereof, for example by way of threading, on the tip-nozzle inner cylinder 15, and the tip-nozzle outer cylinder 16 is mounted on the wire-type flame spray gun 10 by way of this tip-nozzle inner cylinder 15.

Jet-gas (or jet-mist) for external cooling is supplied to the conical gap between the tip-nozzle inner cylinder 15 and the tip-nozzle outer cylinder 16, and is ejected from an annular jet opening at the front, in the direction of the forward centerline of the flame 17. Thus, the coating formation device 1, which includes the tip-nozzle outer cylinder 16 and the like, performs the characteristic functions of; a) supplying corrosion-resistant alloy material by wire; b) supplying the aforementioned jet-gas or jet-mist that cools the melted material particles and the flame so as to produce a gradually narrowing cylindrical flow from the outer periphery of the tip-nozzle, directed toward the forward (downstream) center; and c) supplying the jet-gas or jet-mist as an annular jet, concentric with the jetted flame (forming a circle that is concentric with the flame, at outside the flame, in a cross-sectional view) at an angle such as to intersect the centerline of the flame at a distance from the flame jet opening that is 3 to 7 times the diameter of the flame.

The tip-nozzle outer cylinder 16 shown in FIG. 1 expels a jet-gas (for example nitrogen) or a jet-mist (for example water mist) as described above, whereby the forward half of the flame 17 (see FIG. 2) that is jetted from the wire-type flame spray gun 10, which is to say the flame 17 in a melting region in which the material-wire is melted, can be partitioned from the open air. A stainless steel double nozzle is used in this embodiment, and, as described above, the tip-nozzle inner cylinder 15 and the tip-nozzle outer cylinder 16 are arranged concentrically, so that a gap is provided between the two, and this gap serves as a flow path for the jet-gas or jet-mist, and also as a jet opening for this gas. A cooling gas flows between the cylinders of the double nozzle (tip-nozzle inner cylinder 15 and tip-nozzle outer cylinder 16), whereby temperature rises in the tip-nozzle inner cylinder 15 and the like are prevented. The gap between the cylinders of the double nozzle (tip-nozzle inner cylinder 15 and tip-nozzle outer cylinder 16) is provided oriented toward the centerline of the flame 17, and the jet-gas or jet-mist is positively jetted in the direction of the center of the flame 17. The intersection of the jet-gas or jet-mist with the centerline of the flame 17 is positioned forward from the jet opening for the flame 17 by a distance that is 3 to 7 times the diameter of the flame 17, whereby the jet-gas or jet-mist rapidly cools the fully melted material at the forward end region of the flame 17, which has the effect of making the structure thereof more fine.

When the wire-type coating formation device 1 in FIG. 1 is used, a sprayed coating 18 can be formed on the surface of a substrate 19, as shown to the right in FIG. 2. The flame 17 that is jetted from the gas cap 14 of the wire-type flame spray gun 10 reaches the substrate 19 surrounded by jet-gas or jet-mist that is jetted from the tip-nozzle outer cylinder 16 (the jet opening described above), and therefore the amount of oxides present in the sprayed coating 18 is small. Furthermore, as described above, the grain size of the sprayed coating 18 is also reduced due to the rapid cooling.

Figure 9:
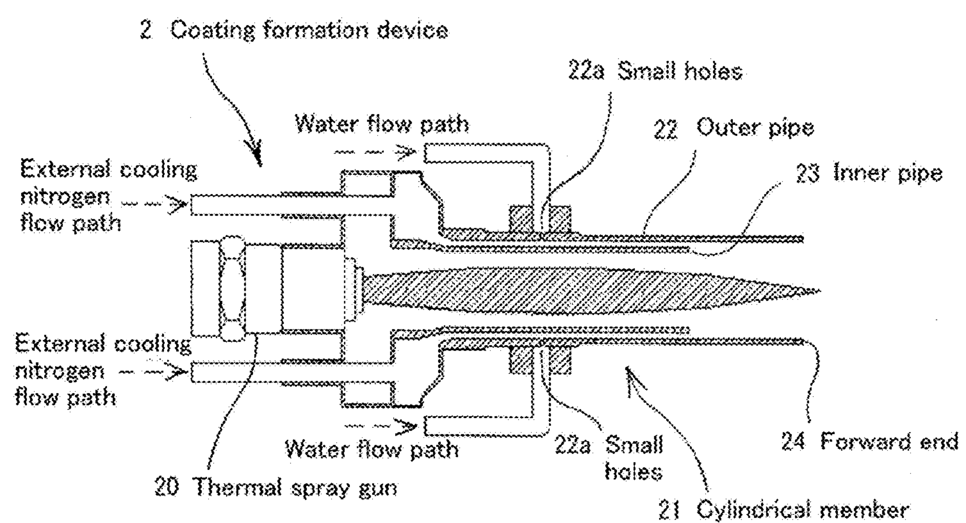
FIG. 9 This is a side view showing a powder-type coating formation device 2.

In place of the coating formation device 1 shown in FIG. 1 and FIG. 2, the coating formation device 2 shown in FIG. 9 may also be used. The coating formation device 2 is one wherein a cylindrical member 21 or the like, which may also be referred to as an outer cooling device, is mounted at the front of a powder-type flame spray gun 20. While illustration of the main unit of the thermal spray gun 20 is omitted, this is connected to a pipe that supplies a powdered material to be sprayed together with a transport gas (for example nitrogen) and supply pipes for oxygen and acetylene, which serves as the fuel, as well as a supply pipe for an internal cooling gas (for example nitrogen). The flame and the molten material (the melted powder) are jetted from the thermal spray gun 20.

The cylindrical member 21, serves to partition the flame from the open air, at the forward half of the flame that is jetted by the thermal spray gun 20, which is to say, in the melting region in which the powder material is melted, and to discharge a jet-mist or jet-gas from the forward end to the rear half (the forward part) of the flame. In this embodiment, a double cylindrical pipe made from stainless steel is used as the cylindrical member 21, in which an outer pipe 22 and an inner pipe 23 are arranged concentrically, with a gap between the two. A jet-mist or a jet-gas for providing external cooling of the flame and the molten material is supplied to this gap, and is ejected from the forward end 24. In this regard, if water is dripped from fine holes **22*a* that are provided in the outer pipe 22, a jet-mist will be formed by way of the nitrogen gas ejector effect, and the jet-mist will flow between the outer pipe 22 and the inner pipe 23 so as to be jetted from the forward end 24**.

Using either the coating formation device 1 shown in FIG. 1 and FIG. 2, or the coating formation device 2 in FIG. 9, a good Al—Mg coating, which has excellent corrosion resistance, can be formed on the surface of a steel structure. Furthermore, a good coating can also be formed on the surfaces of substrates made from aluminum, aluminum alloys or the like, rather than steel structures. This is because the use of the formation device 1 or 2 in which the molten material and the flame are cooled by the jet-gas or jet-mist results in reduced thermal impact on the substrate.

WORKING EXAMPLES

The sprayed coating is formed by way of the following procedure.

First, the surface of a steel plate (substrate) is blasted with alumina grit or steel grit. Next, an Al—Mg material is sprayed onto the surface of the substrate with the coating formation device 1 (wire type) or 2 (powder type). Specifically, the Al—Mg material is melted in a reducing atmosphere by adjusting the ratio of oxygen to acetylene, which is the combustion gas, and a jet-gas or jet-mist is caused to flow along the double nozzle so as to partition the melted material from the open air, so as to form a sprayed coating on the steel plate (substrate) at a cooling rate of approximately 1,000,000° C. per second or greater.

Note that, unless otherwise stated, the present invention is that wherein spraying is performed according to the conditions in Working Examples 1 to 3, and the prior art is that wherein spraying is performed according to the conditions in Comparative Examples 1 and 2. The conditions are shown in Table 1.

TABLE 1

| | Working Example 1 | Working Example 2 | Working Example 3 | Comparative Example 1 | Comparative Example 2 |
|---|---|---|---|---|---|
| Acetylene/oxygen ratio | 6:5 | 6:5 | 7:6 | 1:1 | 2:3 |
| Material supply method | Powder type | Wire type | Powder type | Wire type | Powder type |
| Thermal spraying material | Al-5 mass % Mg | Al-5 mass % Mg | Al-5 mass % Mg | Al-5 mass % Mg | Al-5 mass % Mg |
| Internal cooling gas | Nitrogen 70 L/min | Nitrogen 900 L/min | Nitrogen 70 L/min | Air 900 L/min | Air 70 L/min |
| External cooling gas | Nitrogen 400 L/min | Nitrogen + mist 900 L/min | Nitrogen + mist 680 L/min | none | none |

The properties of the Al—Mg coating formed on the surface of the steel plate (substrate) as described above were found by way of the following tests.

1. Combined Cycle Test

Figure 3:
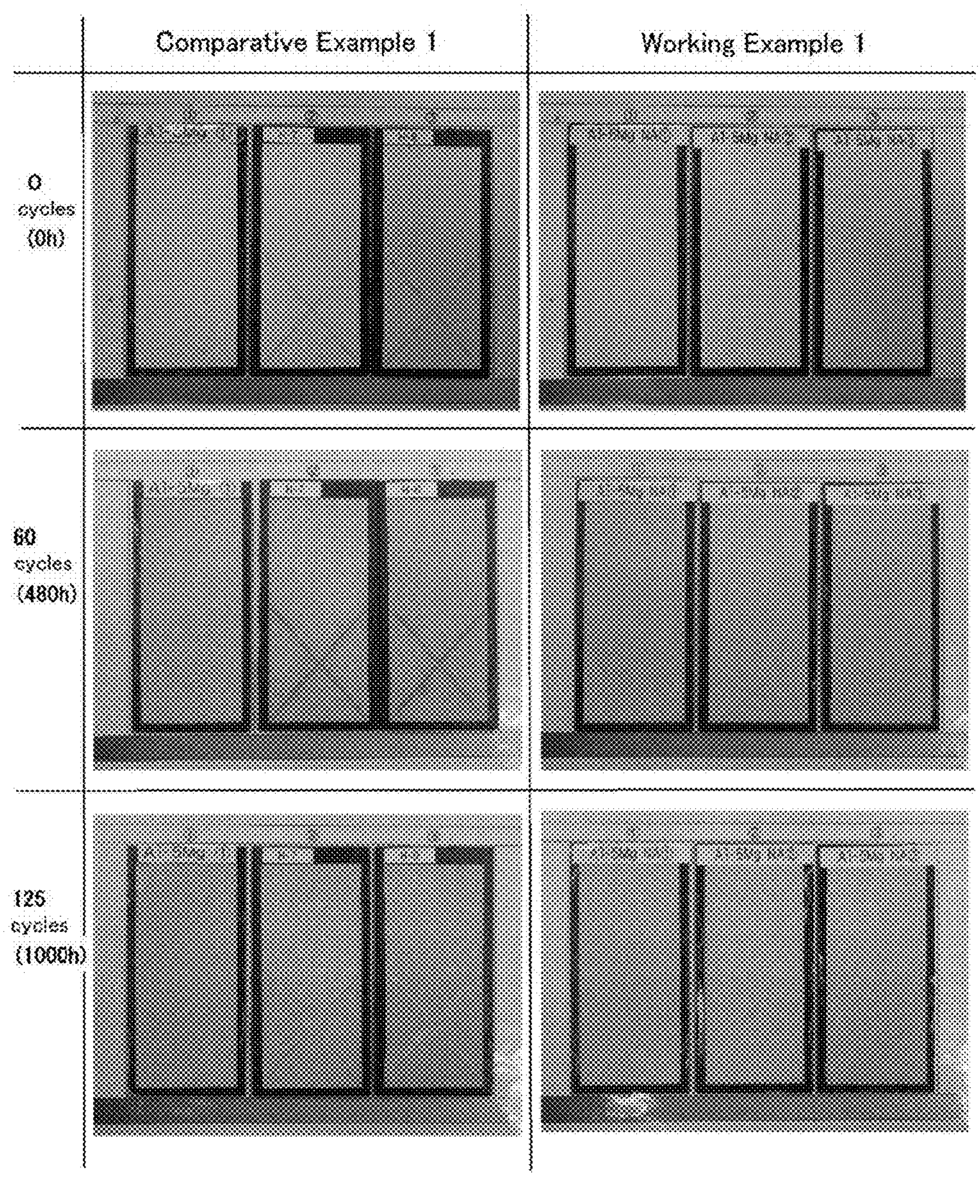
FIG. 3 This shows the results of combined cycle tests.

Plate corrosion resistance was evaluated for a steel plate on which the sprayed coatings were provided by performing an accelerated corrosion test in accordance with JASO M 609, 610, in which cycles were repeated consisting of: saline spraying (5% aqueous solution of NaCl/35° C./100% humidity/2 hours)→drying (65° C./25% humidity/4 hours)→wet (high temperature) (50° C./98% humidity/2 hours), so as to evaluate Working Example 1 and Comparative Example 1. The film thicknesses of the sprayed coating on the test pieces in these tests were 150 to 200 μm. Note that the test described above was performed after making scratches, that reached the steel base, on the steel plate provided with the sprayed coating by using a cutter. The coatings after the test are shown in photographs in FIG. 3. The white rusts in the Comparative Example 1 are oxides of aluminum or magnesium, suggesting that the coating was degraded early, while in Working Example 1, the results were good, with neither red rust nor white rust forming, even after 1000 hours (125 cycles).

2) CASS Test (Copper Accelerated Acetic Acid Salt Spray Test)

The spray test was conducted over 48 hours, in accordance with JIS H 8502, in which a pH 3.0 test solution of 40 g/liter sodium chloride and 0.205 g/liter of copper(II) chloride was sprayed at an air saturator temperature of 63° C., and a test tank temperature of 50° C., at a spray rate of 2.0 mL/80 $cm^2$/hour, and a compressed air pressure of 0.098 MPa. Working Example 1 and Comparative Example 1 were evaluated. In these tests, the film thicknesses of the test pieces were 250 to 300 μm. Changes in the surface conditions such as discoloration, stains, corrosion, surface degradation, peeling and the like, and changes in the weight of the test pieces after the tests are shown in the following Table 2. An $Al(OH)_3$ corrosion product was formed as a result of an aluminum dissolution reaction and weight was lost as a result of the gel-like $Al(OH)_3$ running off.

TABLE 2

| | Working Example 1 | Comparative Example 1 |
|---|---|---|
| Coating type | Al—Mg | Al—Mg |
| Surface condition | Good | Discoloration |
| Weight change | Δ1.7% | Δ9.6% |

3) Elemental Analysis Tests

The results of analysis produced by ICP emission spectrography and inert gas fusion are shown in Table 3. As per Table 3, there was no difference in the ratio of oxygen in the sprayed materials in Working Example 1 and Comparative Example 1, but in the sprayed coatings, the oxygen content in Working Example 1 was less than 0.2 mass %, while in Comparative Example 1 the oxygen content was more than 0.2 mass %. Accordingly, it can be said that oxidization of aluminum and magnesium is better prevented in Working Example 1 than in Comparative Example 1.

TABLE 3

(mass %)

| | Thermal spraying material | | | Sprayed Coating | | |
|---|---|---|---|---|---|---|
| | Al | Mg | O | Al | Mg | O |
| Working Example 1 | 94.86 | 5.14 | <0.00* | 93.3 | 3.75 | 0.17 |
| Comparative Example 1 | 94.66 | 5.34 | <0.00* | 94.4 | 4.58 | 0.24 |

*Below measurement limit

4) Electrochemical Measurement Tests

Figure 4:
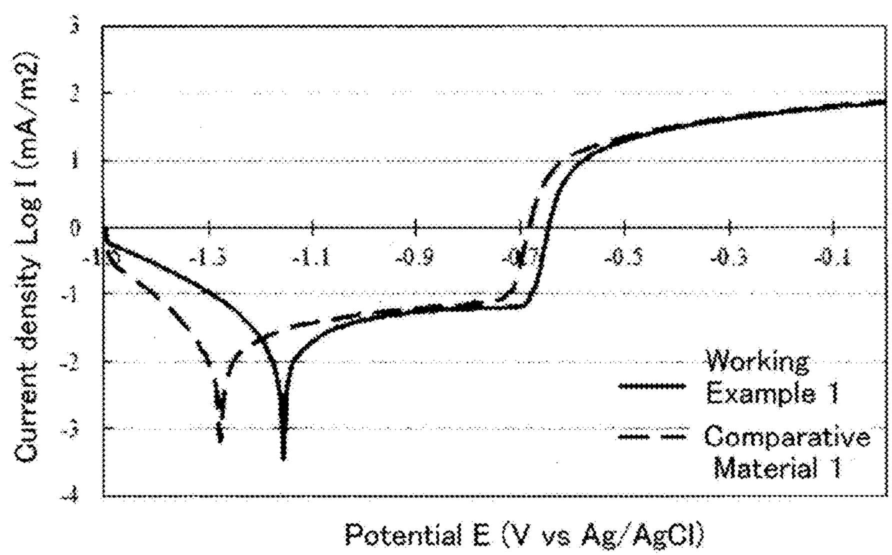
FIG. 4 This shows the results of polarization measurement tests.

Polarization measurements were performed for the coatings in Working Example 1 and Comparative Example 1, and the results are shown in FIG. 4. The natural potential in Working Example 1 was Δ1.161 V, while the natural potential in Comparative Example 1 was Δ1.277 V. The Al—Mg coating is less noble than steel, and thus provides a sacrificial corrosion protection function. Note that the natural potential of steel is from Δ0.4 V to Δ0.6 V. Since Working Example 1 is more noble than Comparative Example 1 and the protection current is suppressed more than in Comparative Example 1, diffusion of oxygen in the Al—Mg sprayed coating is limited, and thus improved corrosion protection life in salt water can be expected.

5) SEM Images

Figure 5:
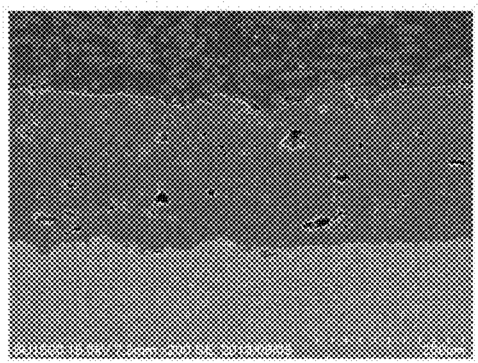
FIG. 5 This is an SEM sectional view of a sample wherein Al—Mg was sprayed on an iron substrate.
Figure 5:
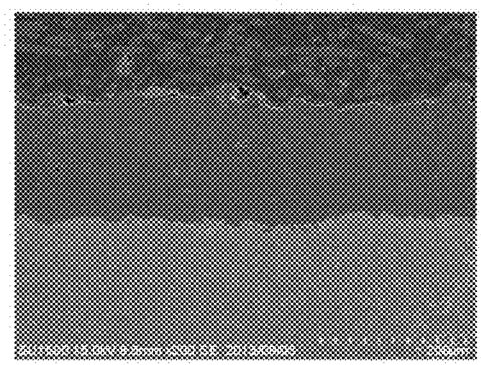
Figure 5:
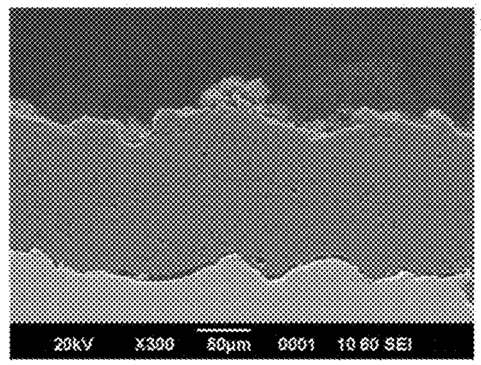
Figure 5:
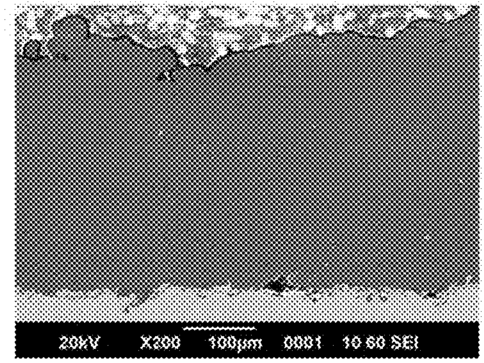

SEM observation was performed for Working Examples 1 to 3 and Comparative Example 1, and the SEM images are shown in FIG. 5. The porosity in Working Examples 1 to 3 was 1% or less, and thus it could be confirmed that there were less pores and cracks than in Comparative Example 1.

Figure 6:
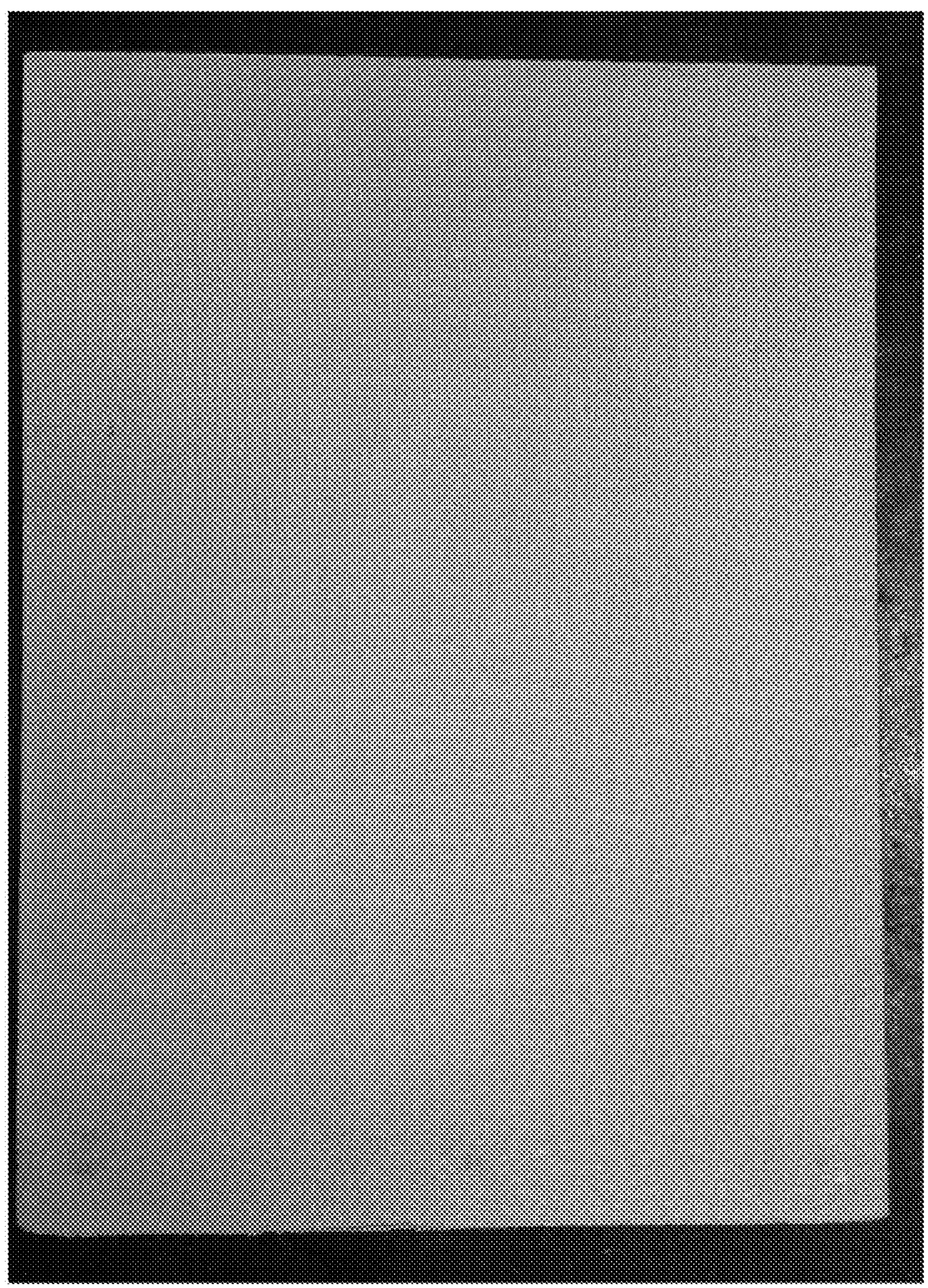
FIG. 6 This shows the results of ferroxyl tests.

Note that a ferroxyl test was performed on Working Example 1, in accordance with JIS K 8617, in which pure water was added to 10 g of potassium hexacyanoferrate trihydrate, 10 g of potassium hexacyanoferrate and 60 g of sodium chloride, and this was brought to 1000 ml. Defects reaching the substrate can be observed as blue spots, but there were no spots in Working Example 1. The results of the ferroxyl test for Working Example 1 are shown in FIG. 6.

6) EBSP Analysis

Figure 7:
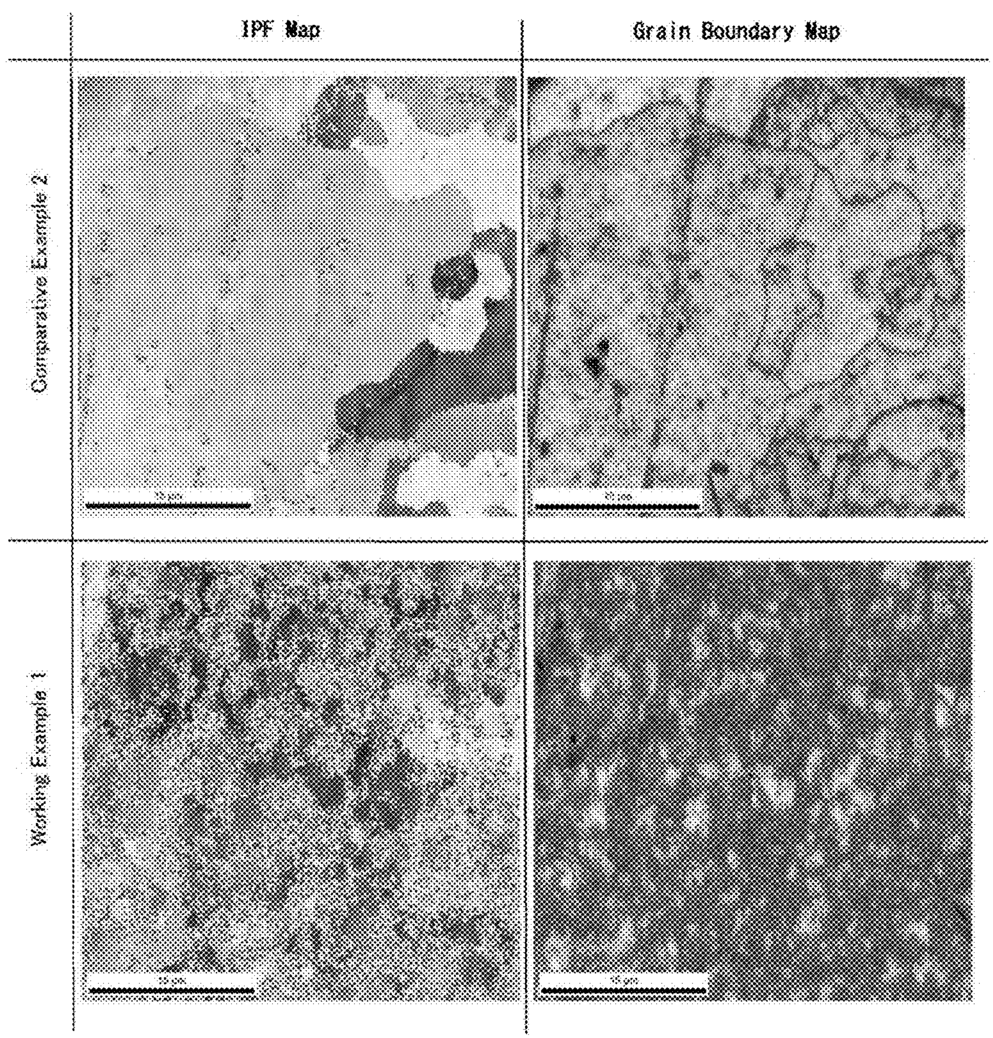
FIG. 7 These are EBSP analysis maps.

EBSP (electron back scattering pattern) analysis was performed for the coatings in Working Example 1 and Comparative Example 2, and the results are shown in FIG. 7. It was confirmed that the grain size in Working Example 1 was 10 μm or less, which was a much finer grain size than that in Comparative Example 2.

When spraying is performed using the coating formation device 1 or 2 in FIG. 1 and FIG. 2 or FIG. 9, the thermal impact on the substrate is low, due to the rapid cooling of the melted material and the flame by the external cooling using the jet-gas or jet-mist, and thus there will be no problems, even on substrates with low melting points (aluminum or aluminum alloys or the like).

Figure 8:
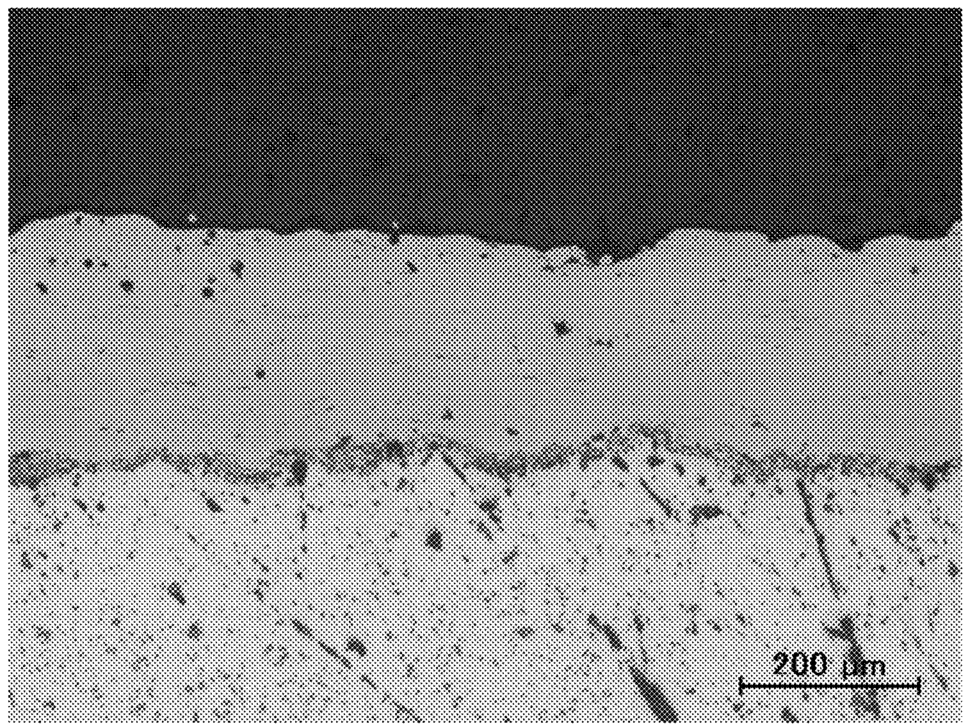
FIG. 8 This is a sectional view with a metallurgical microscope of a sample wherein Al—Mg was sprayed on an aluminum substrate.

Here, with aluminum as a substrate, a sprayed coating was formed on the surface of said substrate using the same conditions as in Working Example 1. The cross-section thereof taken with a metallurgic microscope is shown in FIG. 8.

The invention claimed is:

1. A method for forming a corrosion-resistant sprayed coating, wherein a corrosion-resistant alloy sprayed coating comprising aluminum that has a porosity of 1% or less, with the surface thereof unsealed, and that forms a microstructure with a grain size of 10 μm or less, is formed on a substrate surface, using a thermal spray gun having a function wherein a flame including melted material particles is jetted toward a substrate, and the flame is partitioned from the open air in an upstream region on said jet path, and a function wherein, in a downstream region, the material particles and the flame are forcibly cooled by a jet-gas or jet-mist before reaching the substrate, and although thermal spraying is performed with a corrosion-resistant alloy material comprising aluminum as the material particles, neither laser irradiation nor extrusion processing are performed, wherein at least some of the microstructure includes a nanostructure with a submicron grain size, and wherein the corrosion-resistant alloy sprayed coating comprises magnesium of 0.3 to 15 mass %, oxygen of 0.2 mass % or less, and a remaining balance of aluminum.

2. The method for forming a corrosion-resistant coating according to claim 1, wherein the corrosion-resistant alloy coating is formed on the surface of a substrate made from aluminum or an aluminum alloy.

3. The method for forming a corrosion-resistant sprayed coating according to claim 1, wherein the amount of oxygen supplied to the flame in the upstream region where the flame is partitioned from the open air is less than the amount of oxygen necessary for complete combustion.

4. The method for forming a corrosion-resistant sprayed coating according to claim 1, wherein the corrosion-resistant alloy material is supplied to the thermal spray gun in the form of a powder or a wire.

* * * * *